July 28, 1964     F. P. EVANS     3,142,751
RATIO DEVICE
Filed May 19, 1961

INVENTOR
FREDERICK P. EVANS
BY *Norman Friedland*
AGENT ial # United States Patent Office 3,142,751
Patented July 28, 1964

3,142,751
RATIO DEVICE
Frederick P. Evans, West Hartford, Conn., assignor to United Aircraft Corporation, East Hartford, Conn., a corporation of Delaware
Filed May 19, 1961, Ser. No. 111,225
7 Claims. (Cl. 235—200)

This invention relates to a fluid servo control system and more particularly to a sensing device which measures the ratio of two variable signals.

In heretofore known designs for ratio sensing devices, the mechanism generally consisted of computing linkages, levers, and variable area devices such as diaphragms and pistons all of which are usually complicated, expensive, and in most instances are impractical where they are employed to be used in an environment which operates under a wide range of pressures. More recently, sonic pneumatic types of ratio sensing devices have come into being and although such devices afford certain advances as far as simplicity and expense are concerned, the utilization of a "choked" orifice is a desirable prerequisite for their proper operation. That is to say that these devices require a source of pneumatic pressure and that at least one of the orifices in the system is designed so that its area will allow sufficient flow to pass therethrough whereby the velocity in the throat of the orifice is always sonic.

With the foregoing in mind, this present invention has as one of its objects means for providing an output signal which is substantially equal to the ratio of two sensed variables. Such a device is characterized as being reliable in operation, substantially economical to build, and simple in construction and capable of use over a wide range of forces.

Another object of this invention is to provide in devices of the character described, a ratio computing device which establishes a pressure which is a function of the sensed forces and feeds a signal proportional thereto into a differential responsive output producing device whereby the output is equal to the ratio of the sensing variable signals.

It still is a further object of this invention to sense variable signals by pneumatic means and compute their ratio value by the utilization of a hydraulic medium.

It still is another object of this invention to provide an improved pressure ratio sensing device for controlling a mechanism located remotely from the point where the variable signals are sensed.

It still is a further object of this invention to provide in a device, as described, a totally gain compensated system. That is to say that the gain will remain fixed regardless of the levels of pressure sensed so that, in the entire range of pressures, the output will respond at a given time in accordance with the input signals.

Other objects and advantages will be apparent from the specification and claims and from the accompanying drawings which illustrate an embodiment of the invention.

Figure 1:
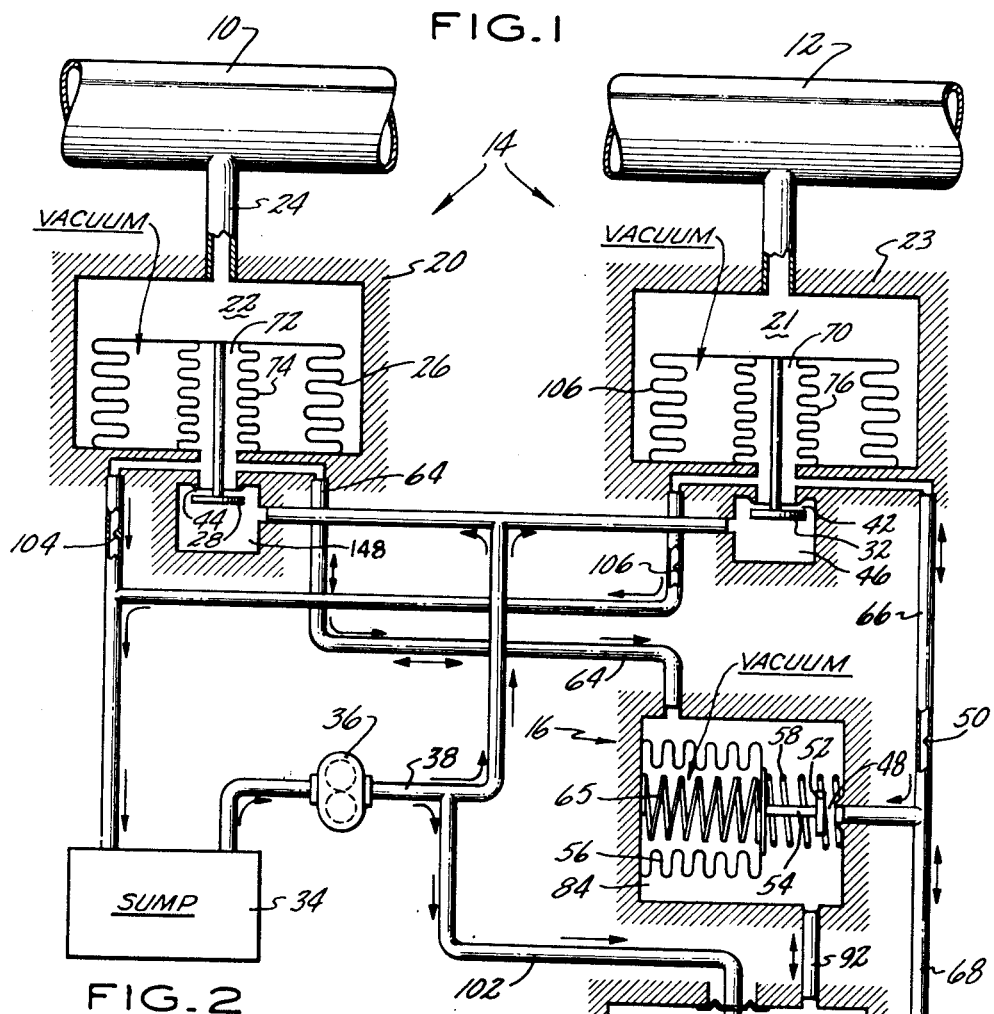
FIG. 1 is a schematic illustration of my invention.

Referring now more particularly to FIG. 1, which is a preferred embodiment for illustrating my novel device, numerals 10 and 12 represent fluid transmitting pipe lines and are intended merely to illustrate two variables whose ratio my novel device is capable of measuring. The variables in this instance are the static pressures of the moving fluid stream evidenced in lines 10 and 12. For illustration purposes, the present discussion will consider the device as having three major systems wherein numeral 14 generally indicates the sensing system, numeral 16 generally indicates the computing system, and numeral 18 generally indicates the output producing system. Since the sensing system contains two identical sensing devices, the description will only concern itself with explaining the operation and mechanism of one of its systems. The sensing mechanism comprises an outer casing 20 defining a fluid receiving chamber 22 which has a feed line 24 admitting a pneumatic fluid from pipe line 10 internally to chamber 22. Chamber 22 contains an evacuated bellows 26 which has one end secured to the housing 20. A movable valve 28 is attached to the free end of bellows 26. Thus it is apparent that the translating force on valve 28 is proportional to the absolute value of the pressure sensed in the pipe line 10, and similarly the translating force on valve 32 is proportional to the absolute pressure value of the fluid in pipe line 12. The effect of the axial stiffness of the bellows 26 is so slight that the pressure in chamber 72 is automatically varied by the control valve 28 so as to balance the pressure in chamber 22 acting on the larger bellows 26.

The description will now concern itself with the computing system 16 which receives pressurized hydraulic fluid from fluid containing tank 34. The fluid is pressurized by pump 36 and is directed into the computing circuit by conduit 38. The pair of discharging orifices 42 and 44, or vents, are in parallel with each other and form a variable orifice discharging from chambers 46 and 148 respectively. Valves 28 and 32, which move in response to the absolute pressure value of the variables being sensed, serve to vary the opening of these vents. Interposed serially between these two vents and the pump are restrictions 104 and 106 which conduct fluid from the vents 42 and 44 so that these restrictions 104 and 106 are in series-flow relation with vents 44 and 42 respectively and in parallel-flow relation to vent 48 and restriction 50. Vent 48 is a variable orifice which is controlled by valve 52. And restriction 50 may be a fixed restriction which is designed to have a definite area relationship to the variable vent 48 as will be more fully explained hereinafter. The valve stem 54 connects valve 52 to the free end of evacuated bellows 56 which serves to adjust the opening and closing of vent 48. Opposing springs 58 and 65 act on the free end of evacuated bellows 56 for balancing the forces on the working surface of the bellows. The vents and orifices are arranged in this particular manner so that the computing device will produce a pressure in line 68 which is a function of the sensed variables, and this pressure, as will be noted, hereinafter, is transmitted to a working bellows or bellows motor 62 which serves to produce a signal which in turn will be equal to the ratio of the two sensed variables.

Continuing with the explanation on the computing system and as mentioned above, the vent 42 is connected to passage 66 from where its flow is divided to pass through either vent 48 or line 68 which leads to the bellows motor 62. The flow egressing from vent 48 passes through line 64 which is connected to the restriction 104. Some of the flow in both lines 66 and 64 is conducted to chambers 70 and 72 respectively, so that the pressure in the chambers equals the pressure in the respective lines. Disposed at one end of each chamber are bellows 74 and 76 which serve to subject the valves 28 and 32 to a force proportional to the pressure in line 64 and 66, respectively. The purpose of these pressure feedback connections is to maintain the pressures in the lines 64 and 66 proportional to the variable signals being sensed by the sensing system 14. For the moment, looking at the left-hand system, it will be appreciated that the three forces imposed on valve 28 are (1) force generated by evacuated bellows 26 which, as mentioned above, is proportional to the absolute value of the pressure in line 10; (2) the dynamic effect of the flow ingressing from the vent nozzle 44; and (3) the force generated in the bellows 74 which is proportional to the pressure in line 64. To obtain force equilibrium of valve 28, the force generated by bellows 26 must be equal to the force generated by bellows 74 and the small additional force of the vent 44. Until that equalization is achieved, the valve 28 will continue to translate along its axis. It then follows that since these forces must be equal to achieve equilibrium, then the pressure in line 64 must therefore be proportional to the absolute value of the fluid pressure in line 10. And similarly, the pressure in line 66 must be proportional to the absolute value of the fluid pressure in line 12. In effect, therefore, what has been achieved by this sensing system 14 is to establish pressures in lines 64 and 66 whose values are proportional to the pressures in lines 10 and 12, respectively. Since the force generated by the ingressing flow impinging on the valves 28 and 32 is small, these forces can be considered linear with pressures 64 and 66 respectively. To simply computations, the effect of this force is treated as an effective slight variation in bellows area 72 or 74 therefore introduces an inconsequential error. If this force or the similar force on valve 52 were of serious magnitude, the force could be eliminated by use of the balanced control valve, as is shown in U.S. Patent No. 2,912,010, issued to F. P. Evans et al. Chambers 46 and 148 are connected to a high pressure source via line 38, and this high pressure source may be created by a pump 36.

To convert these hydraulic pressure signals which have been created by the pneumatic sensing system 14 to the desired hydraulic pressure signal, I dispose a vent 48 and restriction 50 in series flow relation and use the pressure intermediate these between the vent 48 and restriction 50. By the variable vent 48 I automatically regulate the pressure drop across this vent to give a value which is a function of the ratio of the variable signals. The passage 64 connecting chamber 84 to vent nozzle 44, it will be noted, is unobstructed, and consequently, the pressure in chamber 84 is equal to the pressure in line 64 which in turn is proportional to the absolute value of the fluid pressure in line 10 as described above. By the proper selection of the spring rates acting on the working face of evacuted bellows 56, valve 52 varies the area of orifice 48 to establish the value of the pressure difference from line 68 or internally of bellows 62 to the chamber 94 at a value which is a function of the ratio of the pressures in lines 64 and 66.

A mathematical explanation is necessary to show that the relationship of the ratio of the two sensed signals is equal to the pressure differential across bellows 62, and it can be shown empirically that this relationship exists. Thus, it will become apparent by the mathematical explanation to follow, to one skilled in the art, that the position of the free end of bellows 62 is substantially proportional to the ratio of the pressures sensed in lines 10 and 12.

Figure 2:
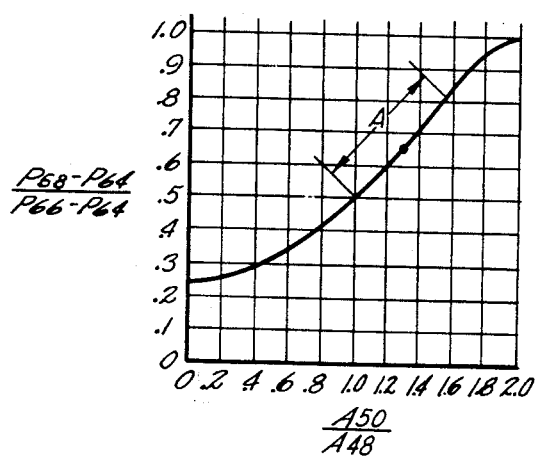
FIG. 2 is a graphic representation of the ratio of pressure drops of fluid compared to ratio of orifice sizes.

FIG. 2 is a well-known representation of the pressure characteristics of fluid flowing through serially connected orifices which in this instance are represented by vent 48 and restriction 50 of FIG. 1. (The subscripts correspond to the numerals in the drawing.) Thus, in this graphical representation, the ratio of the pressure drop across restriction 48 to the total pressure drop across vent 48 and restriction 50 is plotted against the ratio of the area of the vent 48 to the area of restriction 50 which produces a bent curve whose portion A is substantially straight. It will be noted that in the design of this mechanism I have selected the orifice areas so that the value of the ratios will always fall within the linear portion of the curve.

As mentioned above, the pressure in line 64 is proportional to the absolute value of the pressure in line 10 or expressed mathematically (1) $\qquad P_{64} = C_1 P_{22}$ where P represents the pressures in their respective chambers and C represents design constants such as bellows rates and area ratios. Similarly, for the reasons just mentioned (2) $\qquad P_{66} = C_2 P_{21}$ Since $A_{48}$ is regulated by the evacuated bellows 56 which is subjected to the force generated by the springs 58 and 65 and the pressure in chamber 84 is equal to $P_{64}$, then it follows that:

(3) $\qquad A_{48} = C_3(P_{64}) + K$ where $A_{48}$ represents the area of the vent and K represents other design constants which may be negative.

So long as the ratio of the orifice areas corresponds to the linear portion of curve A in FIG. 2, it follows then that the ratio $$\frac{(P_{68} - P_{64})}{(P_{66} - P_{64})}$$

is substantially proportional to the ratio $$\frac{A_{50}}{A_{48}}$$

or expressed mathematically (4) $\qquad \dfrac{P_{68} - P_{64}}{P_{66} - P_{64}} = C_4 \dfrac{A_{50}}{A_{48}}$ Substituting the value of $A_{48}$ from Equation 3 and in rearranging the formula of Equation 4, the following results:

(5) $\qquad P_{68} - P_{64} = C_4 \left( \dfrac{A_{50}}{C_3 P_{64} + K} \right)(P_{66} - P_{64})$ where $C_4$ is a constant acting over the linear portion labeled A of FIG. 2.

By rearranging and mathematical manipulation of Equation 5, the following can be written:

(6)
$$\frac{P_{64}}{P_{66}} = \frac{C_4 A_{50}}{C_3(P_{68} - P_{64}) + C_4 A_{50}} - \frac{K(P_{68} - P_{64})}{P_{66}[C_3(P_{68} - P_{64}) + C_4 A_{50}]}$$

By proper selection and adjustment of springs 65 and 58, the value of K can be made negligible. In this case the Equation above can be rearranged and written as follows, for K=0 (zero):

(7) $\qquad C_3(P_{68} - P_{64}) + C_4 A_{50} = \dfrac{C_4 A_{50}}{\dfrac{P_{64}}{P_{66}}}$ (8) $\qquad (P_{68} - P_{64}) = \dfrac{C_4 A_{50}}{C_3} \left[ \dfrac{P_{66}}{P_{64}} - 1 \right]$ Substituting the values of $P_{66}$ and $P_{64}$ from Equations 1 and 2 into Equation 8 gives the following:

(9) $\qquad (P_{68} - P_{64}) = \dfrac{C_2 C_4 A_{50}}{C_1 C_3} \dfrac{P_{21}}{P_{22}} - \dfrac{C_1}{C_2}$ From Equation 9 the linear variance of $(P_{68} - P_{64})$ with the ratio of the sensed pressures is immediately apparent. Also apparent is the constant "gain" of the device regardless of sensed pressure levels.

Therefore, what has been shown mathematically is that the pressure drop $P_{68} - P_{64}$ is a function of, and in certain conditions, is linearly proportional to the ratio $$\frac{P_{21}}{P_{22}}$$

and since the pressure in chambers 22 and 21 is proportional to the pressure in lines 10 and 12, respectively, it follows that this pressure drop is equivalent to the ratio of the pressures in lines 10 and 12.

Next, referring to the output producing system 18 which receives the signal generated by the computing system 16, a housing 90 encases the motor bellows 62. As will be realized, a branch line 92 connects to chamber 84 to communicate the internal pressure of chamber 84 to the chamber 94 in housing 90. The pressure of the fluid conducting through line 68 internally of bellows motor 62 is substantially equal to $P_{68}$. Thus the free end of the bellows is subject to the forces generated by the difference of the pressure of the fluid in chamber 94 and the pressure of the fluid within bellows 62. The differential across this below, as mentioned above, is proportional to the ratio of the pressure in line 12 to the pressure in line 10 and will translate the bellows free end as a function thereof. Attached to the free end of the bellows is a jet nozzle which is designed to pivot about pivot point 96 and delivers a jet of fluid into a control box generally indicated by numeral 98. The control box represents a device which responds to the ratio of these signals. For an example, of one of the many applications for a device as described in the above consider that the variables being sensed may be static and total pressures of the inlet of an aircraft engine, and such a control may be adapted to vary the fluid intake of the inlet in response to the ratio of these pressures. Schematically illustrated, the jet 100, which moves as a consequence of the computing device 16, is shown as receiving a high pressure fluid through line 102.

Having explained this embodiment of the invention in detail, the operation will now briefly be considered. As mentioned before, both the bellows 74 and 76 cooperate with the vents 42 and 44 for establishing pressures proportional to the value of the pressures in chambers 22 and 21 which in turn are proportional to the absolute value of the pressures in lines 10 and 12. Assume that a change in one of the pipe lines is evidenced and, for example, the pressure in line 10 increases, it would cause bellows 74 and 26 to compress, thus opening the orifice 44. This results in an increase in pressure in line 64 and chamber 84 which acts on an evacuated bellows 56. The movement of bellows 56 is utilized to vary the opening of the restriction 48 through the mechanical connection of valve stem 54. Thus the increase in pressure acting on bellows 56 causes valve 52 to open which in turn decreases the pressure in the bellows 62 which seeks a new position substantially equivalent to the value of the ratio of the sensed pressures. Simultaneously, the feedback function performed by the bellows 74 senses the new pressue value $P_{64}$ and in turn re-adjusts valve 28 until it returns to a position which brings the computing system back into force equilibrium. Since a small force level is all that is required to move valves 28 and 32 and the full movement for the complete range of operating conditions regardless of the pressure levels is relatively small, this mechanism provides a sensitive rapidly responding pressure difference signal as a measure of a sensed pressure ratio. As proved mathematically above, the gain remains constant throughout the operating range. The arrangement provides for transducing a ratio signal into a differential signal and converts the pneumatic sensed signal to a hydraulic output signal. It will be apparent that other fluid mediums may be substituted in lieu of hydraulics and that the ratio of any forces applied by any means to bellows 74 and 76 could be measured by this system.

What has been shown by this device is a rugged, relatively inexpensive computing device which measures a ratio of two variables and is capable of controlling mechanisms far removed from the point where the sensed signals are being generated. Further, the system inherently affords a totally compensated gain so that the gain remains constant regardless of the sensed signal levels.

It is to be understood that the invention is not limited to the specific embodiment herein illustrated and described but may be used in other ways without departure from its spirit as defined by the following claims.

I claim:

1. A computing device for ascertaining the value of the ratio of two variables comprising:

(a) sensing means for sensing the value of each of said variables,
   (b) means responsive to said sensing means for producing modulated pressures proportional to each of said variables,
   (c) a fluid receiving chamber having a movable member for receiving said modulated pressure,
   (d) control means connected betweeen said sensing means and said fluid receiving chamber and being responsive to said modulated pressure for further controlling the pressure of said modulated pressure for controlling the position of said movable member.

2. A pressure ratio device including:

(a) a first pressure source and a second pressure source,
   (b) first and second variable orifices controlled in response to said pressures respectively,
   (c) a source of supply pressure leading to said orifices,
   (d) a first modulated pressure downstream of said first orifice,
   (e) a second modulated pressure downstream of said second orifice,
   (f) a control chamber including a third variable orifice,
   (g) said third orifice having an inlet connected to said second modulated pressure,
   (h) said third orifice having an outlet in said control chamber,
   (i) said third variable orifice being controlled by a function of the value of said first modulated pressure,
   (j) and means responsive to a differential of the pressure in said control chamber and said second modulated pressure whereby an output signal is provided which is a value of said first and second pressure sources.

3. A computing device for ascertaining the value of two variables comprising:

(a) sensing means for sensing the value of each of said variables,
   (b) said sensing means including a first valve and a second valve responsive to said sensing means for producing a first and second modulated pressure proportional to each of said variables,
   (c) control means responsive to said modulated pressure for further modulating the pressure of said first and second modulated pressure,
   (d) said control means comprising:
      (1) an evacuated bellows externally subjected to said first modulated pressure,
      (2) a third valve having one end connected to said bellows and movable therewith,
   (e) an output responsive device including a bellows motor having its internal portion connected to the upstream side of said third valve and its external portion connected to the downstream side of said third valve,
   (f) and an output device responsive to the position of said bellows motor.

4. A ratio computer comprising:

(a) a fluid flow circuit having an inlet connected to a pressure source,
   (b) means responsive to a pair of variables intended to be measured for producing modulated pressures in said circuit,
   (c) a pair of fixed restrictions in parallel relation and a pair of variable restrictions in parallel relation with each other respectively and said fixed and variable restriction being in series relation,
   (d) a pressure responsive device externally subjected to said modulated pressures for varying the pressure intermediate said fixed and variable restrictions,
   (e) a movable member having opposing end surfaces forming a sealed chamber,
   (f) connection means for admitting said intermediate pressure into said sealed chamber so that the pressure will act on one end surface of said movable member,
   (g) and a connection between said pressure responsive device and said movable member for conducting fluid to the other end surface of said movable member.

5. A computer device for ascertaining the value of the ratio of two variables comprising:
   (a) first means responsive to one of said variables for generating a first signal,
   (b) second means responsive to the other of said variables for generating a second signal,
   (c) a source of fluid under pressure,
   (d) control means responsive to said first signal and said second signal for establishing a referenced pressure,
   (e) an output producing device including a movable wall having one end subjected to said referenced pressure,
   (f) connection means connecting said control means to said source of fluid and said control means to said output producing device,
   (g) said control means varying the pressure of fluid acting on an opposing end of said movable wall opposing said referenced pressure so that the pressure differential across said movable wall is equivalent to the ratio of the two variables.

6. A pressure ratio sensor comprising:
   (a) a chamber having a pair of inlets connected to a source of high pressure,
   (b) first valve means responsive to a variable for modulating the flow from said source to one of said inlets,
   (c) second valve means responsive to another variable for modulating the flow from said source to said second opening,
   (d) an evacuated bellows disposed in said chamber and externally subjected to the pressures established by said first valve means and said second valve means,
   (e) a third valve means responsive to the position of said bellows adapted to modulate the flow of fluid from said inlet to said chamber,
   (f) a fixed restriction located upstream of one of said inlets and between said second valve means and said third valve means,
   (g) an output responsive device defining a fluid receiving chamber including a wall member
   (h) connection means leading fluid intermediate said third valve and said fixed restriction to said fluid receiving chamber for acting on one side of said wall member,
   (i) an additional connection means leading fluid from said chamber to said output responsive device to act on the other side of said wall member,
   (j) and means responsive to the position of said wall member.

7. A ratio device comprising, in combination:
   (a) first means for sensing the value of a variable,
   (b) second means for sensing the value of a second variable,
   (c) first and second valve means responsive to said sensing means respectively,
   (d) connection means for conducting fluid from a source of fluid under pressure to said first and second valve means,
   (e) a chamber having a first and second inlet,
   (f) first passage means for admitting modulated fluid from downstream of said first valve means to said chambers through one of said inlets,
   (g) second passage means for admitting modulated fluid from downstream of said second valve means to said chambers through the other of said inlets,
   (h) a fixed restriction located between one of said inlets and said second valve means,
   (i) evacuated bellows externally subjected to the modulated pressure created by said first valve means,
   (j) third valve means connected to said evacuated bellows for further modulating the flow of fluid intermediate one of said inlets and said fixed restriction,
   (k) a bellows motor internally subjected to the pressure of the fluid between said fixed restriction and said third valve means,
   (l) a connection between said chamber and said bellows motor for externally subjecting the bellows motor to the pressure in said chamber,
   (m) and a passage leading the further modulated fluid internally of said bellows motor.

References Cited in the file of this patent
UNITED STATES PATENTS

| | | |
|---|---|---|
| 2,310,546 | Robinson | Feb. 9, 1943 |
| 2,496,181 | Wiegand | Aug. 20, 1946 |
| 2,623,390 | Speckmann | Dec. 30, 1952 |
| 2,747,614 | Gray | May 29, 1956 |
| 2,848,869 | Russ | Aug. 26, 1958 |
| 2,977,991 | Baver | Apr. 4, 1961 |